March 6, 1956  D. W. MOLINS ET AL  2,737,186
MACHINES FOR MANIPULATING CUT TOBACCO
Filed Feb. 6, 1953  7 Sheets-Sheet 2
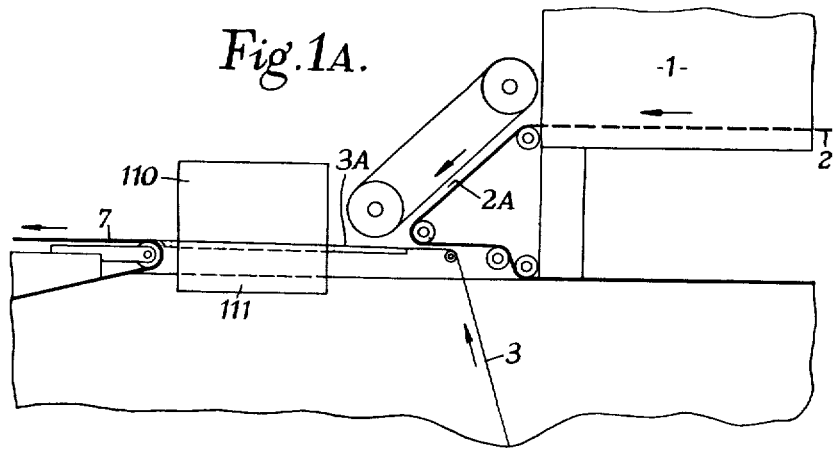
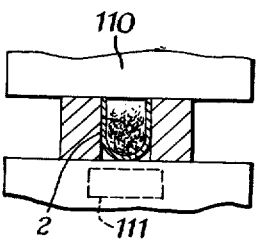
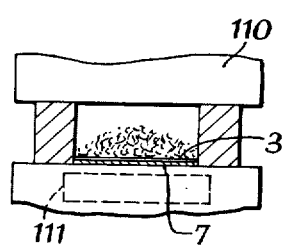
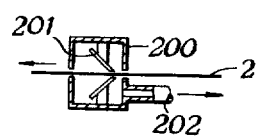
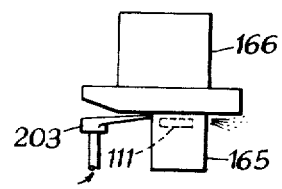
INVENTOR
Desmond W. Molins
Gordon J. W. Powell
BY Watson Cole,
Grindle & Watson
ATTORNEYS

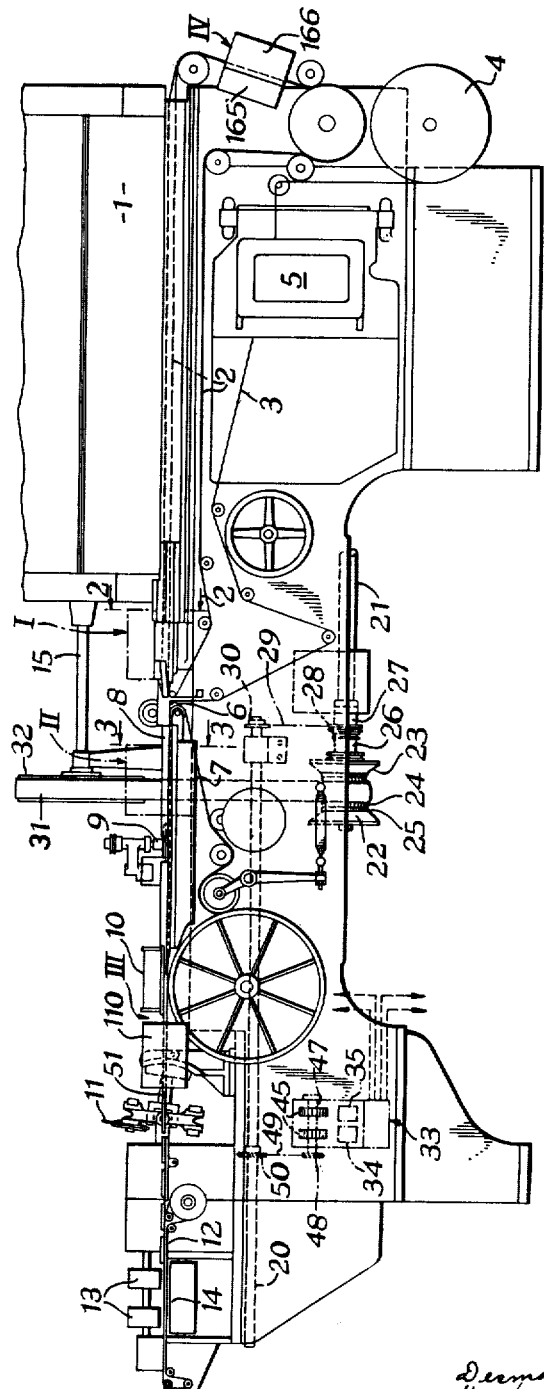

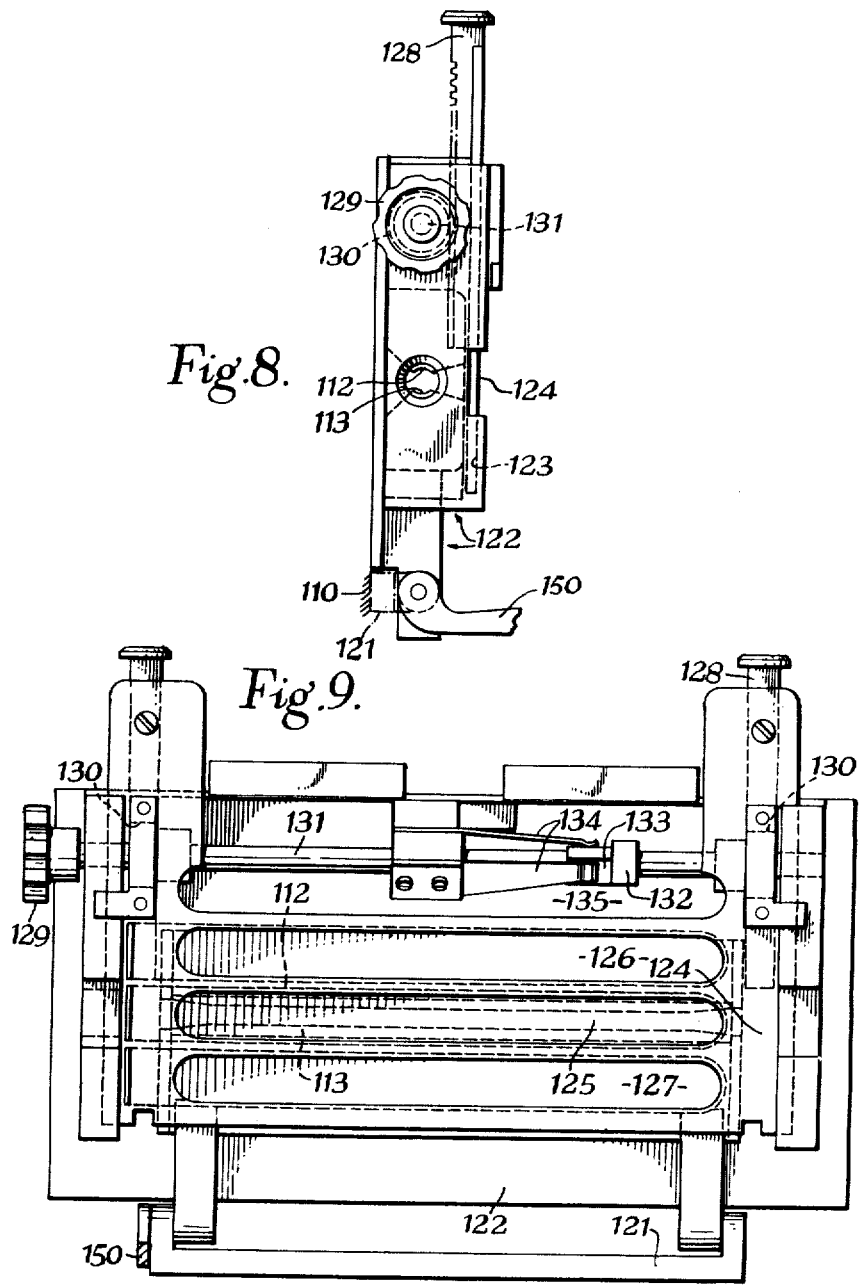

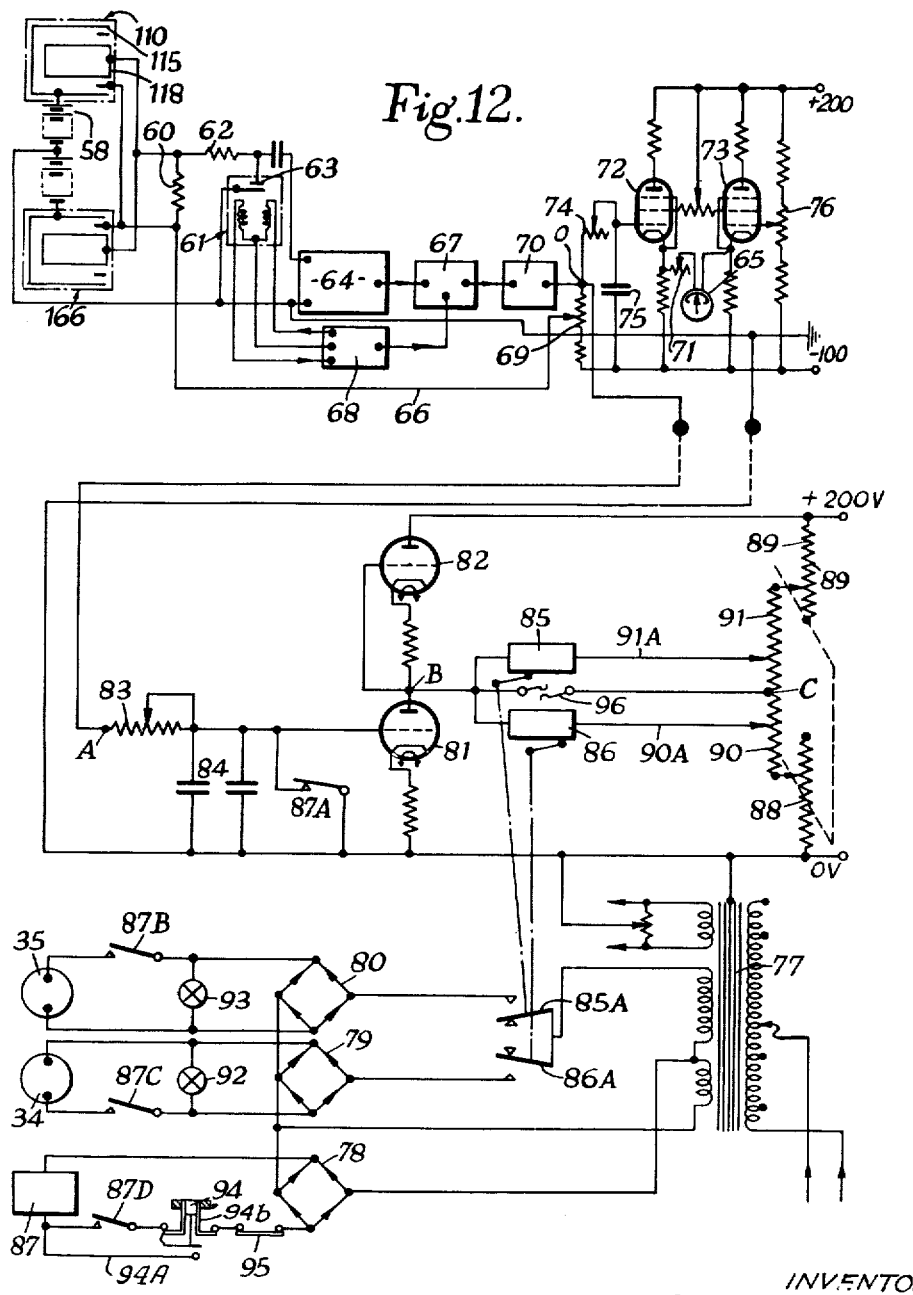

United States Patent Office 2,737,186
Patented Mar. 6, 1956

2,737,186

MACHINES FOR MANIPULATING CUT TOBACCO

Desmond Walter Molins and Gordon Francis Wellington Powell, Deptford, London, England, assignors to Molins Machine Company Limited, London, England, a British company Application February 6, 1953, Serial No. 335,554

Claims priority, application Great Britain December 15, 1952

1 Claim. (Cl. 131—21)

This invention concerns improvements in or relating to machines for manipulating cut tobacco, that is, machines in which cut tobacco is fed from a hopper to form a moving filler on a conveyor system, for example, cigarette making machines and wherein the mass of a length of moving tobacco filler is measured by subjecting the length to rays from a radio-active source of penetrative radiation, for example Beta rays, the ionisation powers of which are absorbed by the material in known proportion to its mass, and determining changes in the absorption with variations in the tobacco mass by an ionisation chamber and applying the current due to the ionisation to regulate at some stage in the machine the rate at which tobacco is being fed at that stage for the formation of the final product. Machines of this kind, hereafter called "machines of the kind referred to" are described in U. S. Patent No. 2,704,079 issued March 15, 1955; U. S. application No. 303,636 filed August 11, 1952 and U. S. application No. 304,412 filed August 14, 1952, and in the example to be described regulation is effected by altering the speed of the hopper.

The apparatus for carrying out the present invention is of much the same kind as that described and illustrated in specification Serial No. 303,636 so far as the devices for measuring the density and the mechanical devices for altering hopper speed are concerned, but in the present case there is provided a limit selection device or "unit" which operates so that at any previously determined percentage deviation, either heavy or light from the desired weight, the hopper will automatically deliver either a greater or less amount of tobacco according to the circumstances to return the density of the rod within the required limits. As the rod is being continuously measured there is little delay in effecting a correction when the deviation exceeds the set limits. The Beta ray device measures the mass of the tobacco but as in normal cigarette manufacture the mass is measured by weighing and the terms "weight" and "mean weight" are in wide use.

The present invention provides apparatus for a machine of the kind referred whereby the mass of the tobacco filler is continuously measured and if the mass deviation beyond predetermined limits from the desired mass, the tobacco feeding rate is altered to restore the filler mass to a value within said limits.

The alteration in the tobacco feed rate may be effected at a constant rate and preferably the correction is effected rapidly so that an average mass within said limits is maintained.

The invention will be more fully described with reference to the accompanying drawings which show its application to a continuous rod cigarette-making machine where, by way of example, the hopper speed is controlled to regulate the rate at which tobacco is fed by the hopper.

In the drawings:

Figure 1 is a diagrammatic front elevation of a continuous rod cigarette-making machine showing the application of the invention thereto.

Figure 1A is a fragment of another design of machine illustrating a modified method of conveying a filler to be measured.

Figure 2 is a diagrammatic section of Figure 1 on the line 2—2 showing one possible location of a radiation device and ionisation chamber.

Figure 3 is a diagrammatic section of Figure 1 on the line 3—3 showing another location of a radiation device and ionisation chamber.

Figure 8 shows parts omitted from Figure 6.

Figure 9 is an elevation looking at the right-hand side of Figure 8.

Figure 12 shows the electrical circuit for the control of an actuator which alters the speed of part of the chine.

Figure 13 shows a detail omitted from Figure 1.

Figure 14 is a diagram of a modification to Figure 6.

Figure 4:
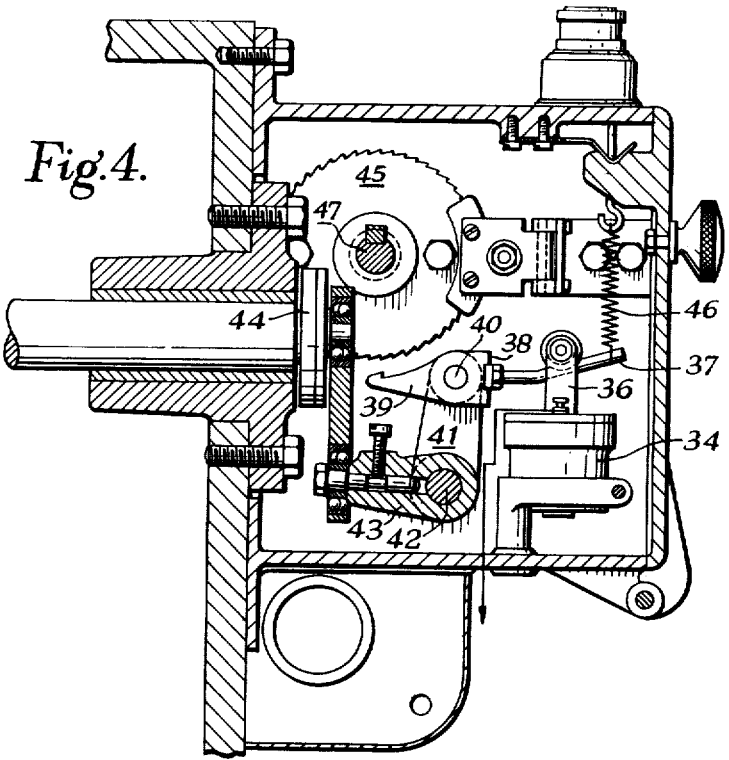
Figure 4 is a sectional elevation of a device for altering a variable speed gear.

Referring first to Figure 1 the cigarette machine is provided with a tobacco feeding apparatus 1 which showers tobacco on a travelling endless belt 2. A paper web 3 is drawn from a reel 4 over the various rollers shown, passing through a printer or the like 5 and finally over a small roller 6 which leads it on to an endless tape 7.

The tobacco on the belt 2 is delivered on to the paper web 3 at the position occupied by the small roller 6 and the tape 7 carries the loaded web through folders and other devices, indicated by the reference 8, where the paper is wrapped around the tobacco core to form a continuous cigarette rod marked 51. The edges of the paper are secured together by paste from a paster 9 whereafter the rod passes beneath a heater 10 which dries the paste after which the rod is severed into separate cigarettes by a cut-off 11. These cigarettes pass on to an endless travelling tape conveyor 12, which carries them to a deflector device 13 where the deflector blades move the cigarettes out of the rod line and deliver them to a catcher band 14.

In order to vary the feed of tobacco to the belt 2 should the average weights of the cigarettes produced deviate too much from the desired weight, there is provided a hopper driving shaft 15 whose speed is regulated through gearing now to be described.

Speed changes are effected by a control shaft 20, movements of which vary the speed of shaft 15 and thus the feed of tobacco. On a shaft 21, which may be the main driving shaft of the cigarette machine, or one coupled to it, there is provided an expanding pulley device. This consists of a fixed cone 22 and a movable cone 23 slidable on a spline on the driving shaft. Between the cones are a number of curved segments 24 which can slide in grooves in the cones as the latter move towards and away from one another and are held to the cones by spring rings 25. The movable cone 23 is moved by a screwed bush 26 which runs on a fixed screw 27, the bush being rotated by a sprocket wheel 28 driven from the shaft 20 by a chain 29 and sprocket wheel 30. Suitable thrust rings are provided and as the bush rotates one way the cone 23 is moved in towards the other, or in the reverse direction, the pull of the spring rings opens the cones.

A belt 31 runs on the expanding pulley and a jockey pulley is provided to take up the slack in the belt, the latter passing over a large pulley 32 on the hopper driving shaft 15. To turn the control shaft 20 there is provided an actuator shown in detail in Figures 4 and 5. Its position is shown in chain lines in Figure 1, at 33. Its construction will now be described with reference to Figures 4 and 5.

Figure 5:
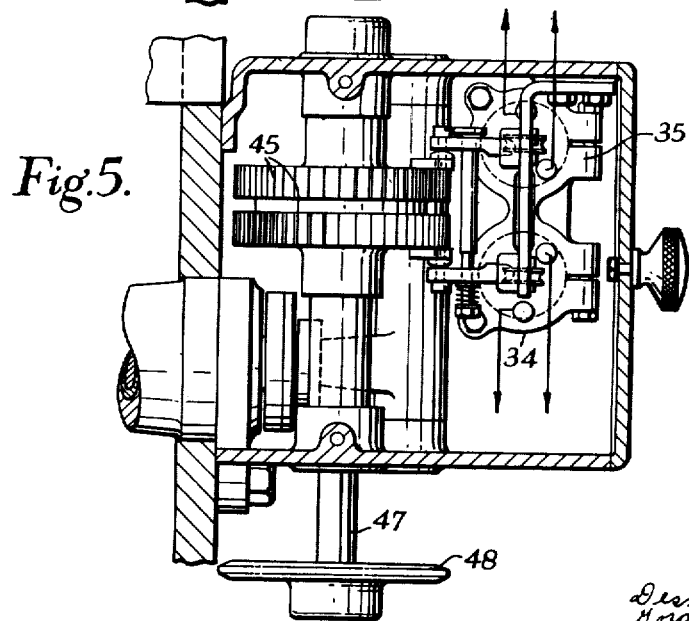
Figure 5 is a plan of Figure 4, partly in section.

Referring to Figure 5 of the drawings, it will be seen that four lines having arrowheads lead from a pair of solenoids 34 and 35 and constitute connections to an electric supply described in detail later with reference to Figure 12.

The plunger 36 of each solenoid is connected to one arm 37 of a lever 38, the other arm of which constitutes a pawl 39. The levers 38 are further connected by bearings formed at the lever pivots 40 to a pivoted lever 41. The pivoted lever 41 is oscillated about its pivot 42 by a link 43 attached to an eccentric 44, see Figure 4, which is driven from the main drive of the cigarette making machine.

By means of this eccentric the pawls 39 are constantly vibrated in the neighbourhood of ratchet wheels 45 and when one of the solenoids 34 or 35 is energised, its plunger 36 is pulled downwardly against the action of a spring 46 and causes the corresponding pawl 39 to engage with a ratchet wheel 45. The wheels 45 are arranged so that one causes a shaft 47 to be rotated in one direction whilst the other causes the shaft to be rotated in the reverse direction. The shaft 47 is connected, as shown in Figure 1, by a sprocket wheel 48 and chain 49 to a sprocket wheel 50 on the control shaft 20 of the variable speed gear through which the tobacco feeding apparatus is driven from the main drive of the cigarette machine and when the shaft 47 is rotated in one direction or the other, the tobacco feeding apparatus operates at a faster speed or slower speed according to the direction in which the shaft is rotated. The correction is to be made as rapidly as possible and since the pawls 39 are in constant oscillation it will be seen that energising of a solenoid causes an immediate response of the correcting means to change the feed rate and the de-energising of said solenoid causes the correction to cease forthwith. Thus with this arrangement there is no lag in the correcting means.

The movements of the actuator 33 to vary the speed of the tobacco feed are obtained from apparatus described later but first a short description of the basic ideas of the invention will be given.

The principle employed is based on the use of rays from a radio-active source, for example Beta rays (or high speed electrons), and an ionisation chamber. In one arrangement the filler or rod, the mass of which it is desired to measure, is arranged between the Beta-ray source and the ionisation chamber. If the filler is being measured, as it must be supported on a conveyor, usually a tape, this may be of U section or, if a flat tape is used, guides must be provided for the sides of the filler. In either case the mass of the side guiding devices is known and can be accounted for when the rays are arranged to pass through guides and tobacco.

Any extraneous material such as the tapes or guides referred to, which intercepts the rays is undesirable and in order to reduce this material to the minimum the ray source and chamber may be disposed above and below the tape. This enables a flat tape to be used so that only a single thickness thereof intercepts the rays and the bulk of the influence is available for tobacco detection. In all cases the arrangement is best in which the minimum amount and thickness of extraneous material is allowed to intercept the rays. In cases where side guides are necessary but the rays do not pass through the guides before and after passing through the tobacco, such guides should be thick enough to absorb all rays meeting them so that the rays passing to the chamber are only those which have passed through the tobacco. The source of the rays may be a radio-active material such as Thallium "204" or Strontium "90." The ionisation chamber is in circuit across a source of D. C. voltage with a resistance of high value. The effect of the high speed electrons entering the chamber is to ionise the contained gas (air) and to cause a minute current to flow in the resistance. The value of this current is substantially proportional over the working range to the number and energy of the electrons entering the chamber and causing ionisation and this number, and hence the current, depends on the absorption taking place in the cigarette and this depends on the mass of the filler being scanned by the source. The current in the chamber is too small for direct practical use and it is amplified to a sufficient degree to operate a direct indicating meter and a circuit to operate the actuator to correct the tobacco fed to form the cigarette rod so as to keep this of uniform weight.

The present method (subject to certain reservations explained later) does not suffer from any difficulties due to moisture content, because, as is known, the absorption of Beta rays depends, for a constant section, entirely on the mass of material through which the rays are trying to pass, and in the case of tobacco with a certain moisture content, if the moisture content be increased, the mass of the rod will be increased, and the ionisation current will be decreased in proportion and an indication of the true weight will be obtained, which is as required.

Tobacco is of fibrous nature, unlike homogeneous material, and the packing of the fibres may vary a small amount along a formed rod or even a loose filler even though the true mass of the rod is substantially constant; because of this the measuring circuit is designed to have a time constant of 1 to 5 seconds as desired so that the reading of weight obtained is the average over this period.

Figure 6:
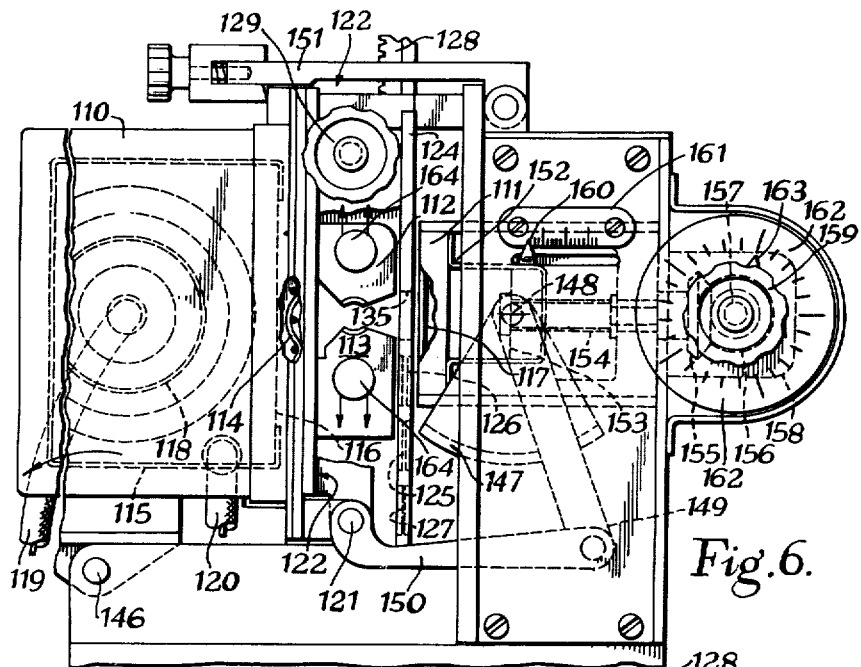
Figure 6 is an end elevation showing the mounting of an ionisation chamber and ray source and associated devices for manipulating the chamber and source, some parts being omitted.

A length of filler or rod of about 6" to 8" is scanned and for this purpose an ionisation chamber contained in a casing 110 is supported at one side of the filler or rod and a ray source contained in a box 111 at the other side, see Figures 2, 3 and 6. These devices are positioned beyond the hopper preferably as near as possible thereto to reduce the delay in correction to the minimum, but in Figure 1, three alternative positions are shown marked I, II and III.

At positions I and II, measurement is made of a loose filler while at III a wrapped rod is measured. Positions I and II show the worst and best conditions respectively for measuring a filler on a tape, as in position I Figure 1, the sides of the tape are practically parallel to the rays, as shown in Figure 2 while at II Figure 1, only the thickness of the tape has to be traversed, as shown in Figure 3. It will be readily understood that by local rearrangement of the machine any desired position intermediate between these extremes can be chosen as a measuring position.

In Figure 2 the U-shaped tape 2 is guided by guides which are made thick for the purpose of absorbing any rays reaching them while in Figure 3 the tape 7 is flat and has the flat paper web on it. Thick side guides are also shown in this view.

It is, however, desirable to avoid all complexities and possible errors due to tapes and guides and this can be achieved by the arrangement shown in Figure 1A. In that figure tobacco showered in the hopper 1 on to the belt 2 is delivered down a passage 2A on to the paper web 3. This web passes beneath an ionisation chamber 110 and above a ray source contained in a box 111. The paper is supported on a metal plate 3A but this is cut away at the measuring position to provide a rectangular aperture as long as the ray source and wide enough to ensure that all the filler, which is concentrated towards the middle of the paper web, is exposed to the rays. The parts of the plate at the sides of the aperture support the margins of the web. In this way only tobacco and part of the web intercept the rays and as the web is uniform in thickness and texture it does not change in ray absorption properties so a measurement is obtained whose variations are solely due to variations in the filler.

Figure 7:
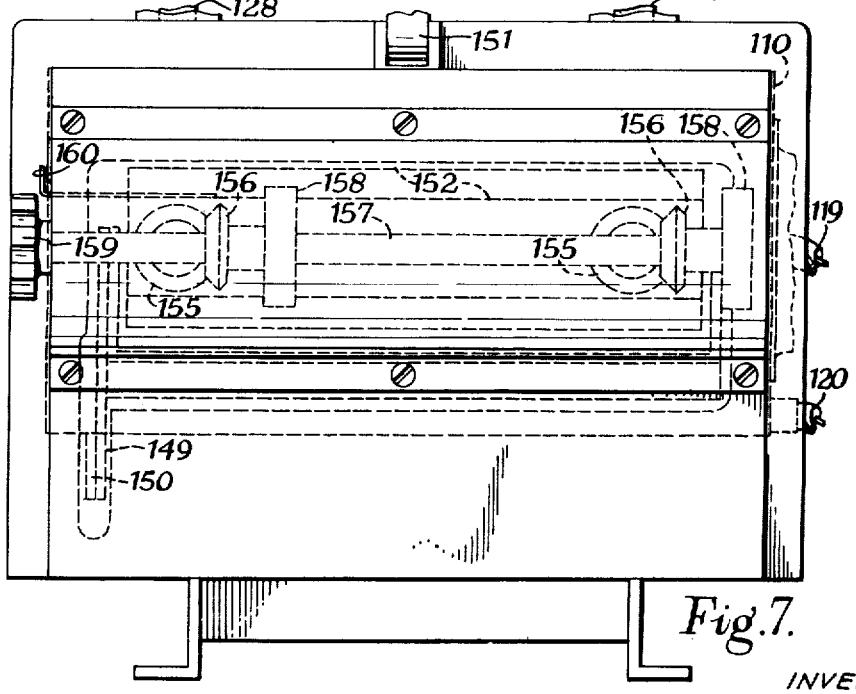
Figure 7 is an elevation looking at the right-hand side of Figure 6.

In position III, Figure 1, the devices are used for checking the wrapped rod and in Figures 6 and 7, to which reference is now directed, they are arranged for use at this position and are provided with rod guides 112 and 113 which are so shaped that only the centre part of the rod is scanned, to avoid any errors which might occur if the whole rod were scanned as the rod is liable to move up and down slightly. By this arrangement there is as small a change as possible in the length of tobacco through which the rays pass.

As will be seen from Figure 1, when the devices are at position III they are located just beyond the heater 10 which seals the overlap of the paper of the cigarette rod.

The chamber casing 110 has a wire mesh guard 114 over its open side. Inside the casing is an inner casing 115 which constitutes the ionisation chamber and has a thin metal window 116 through which the rays can pass. The chamber also functions as one electrode of the device. The box 111 is similarly provided with a window 117 through which rays can pass. Inside the ionisation chamber 115 is an inner electrode 118. The chamber is hermetically sealed and contains air. Cables 119 and 120 connect the two electrodes to the electrical apparatus described later with reference to Figure 12.

A similar device is provided for use as a balancing device as explained later.

Referring now to Figures 6 to 8, at the lower edge of the chamber casing 110 where it faces the ray source in box 111 there is provided a hinge bracket 121 to which is pivotally attached a holder 122, hereafter called a screen holder. The hinge bracket is shown hanging down from its pivot for clearness in Figures 8 and 9, but its proper position with relation to the casing 110 is shown in broken lines in Figure 8. The screen holder has grooves 123, Figure 8, in it in which a screen frame 124, comprising three screens 125, 126 and 127 respectively, Figure 9, can slide. The screen holder is broken away in Figure 6 to show inner parts. Normally the screen holder lies against the face of the chamber casing 110, as in Figure 6, so that the screens are facing the ray source. The screen frame is slid up and down the grooves of the holder by means of rods 128 at each side of the frame which are provided with rack teeth, as shown in Figure 8, and engage pinions 130 on a small shaft 131 journalled across the screen holder 122 and provided with a knob 129 by which it can be rotated. On the shaft 131 there is fixed a cam or detent device consisting of a cylinder 132 on which three flats 133 have been worked, each flat being a chord of the original circular section. These flats co-operate with stiff springs 134, fixed to the holder 122 so that as the knob 129 is rotated and the frame is slide up and down by the pinions and racks, the cam 132—133 rotates and the engagement of the flat springs with the flats on the cam provides a detent which will hold the screen frame in a definite position when the knob is released.

The screen frame comprises a series of apertures, for example, three, the middle one of which has a thin metal covering or screen 125 which is equivalent in absorption to the desired tobacco mass while the apertures above and below the middle one are provided with a thicker screen 126 and a thinner one 127 respectively. The thickness chosen depends on circumstances and the requirements of users, but conveniently the upper one 126 offers the same resistance to the passage of rays as a tobacco rod 4% denser than normal would offer while the lower one 127 offers a resistance of 4% less than the normal rod. These screens may be made of Duralumin. There is a fourth aperture 135 without a screen.

Figure 10:
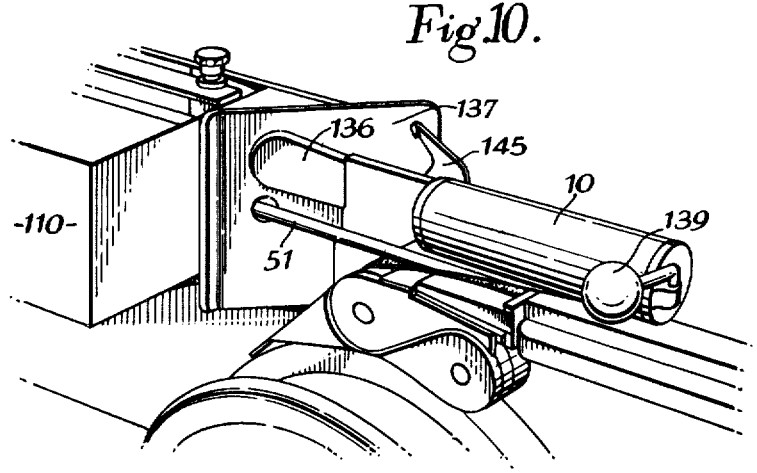
Figure 10 is a perspective view of part of the machine shown in Figure 1 looking substantially in the direction of the arrow marked III.
Figure 11:
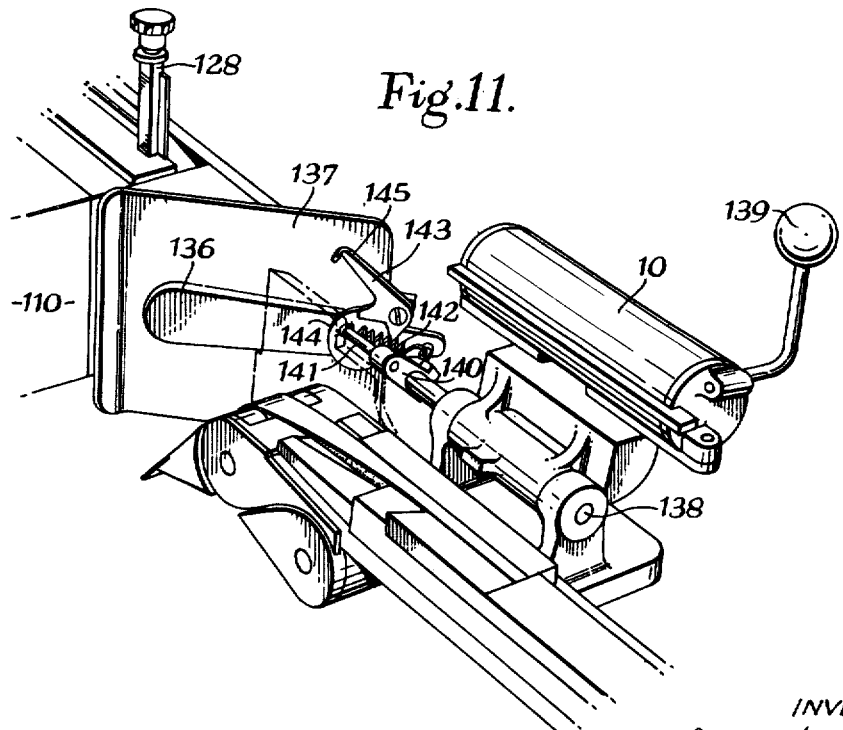
Figure 11 is a view similar to Figure 10 with some parts in a different position.

In use the apparatus is operated with the fourth aperture in line with the rod and, referring now to Figures 10 and 11, if it is desired to check the functioning of the whole control apparatus the cigarette rod 51 is deflected by manipulation by the operator in the known manner and the passage through the rod guides 112 and 113 is closed by a pivoted shutter 136 whereafter the moving rod is turned aside by an oblique guard plate 137. The screen frame is then moved to bring any desired screen into line with the ray source and a reading on a meter 65 (see Figure 12) is taken. Also, if a tape record is being made, the position of the pen on the web or the resultant curve may be noted. When the attendant is satisfied that the apparatus is functioning properly he lifts the shutter 136 to permit the rod to pass through in the ordinary manner and shifts the screen frame back to the fourth aperture position, so that aperture 135 is between the rod and the ray source.

When a machine is being started at the beginning of a run the heater 10 is lifted from the rod engaging position in the usual manner and this movement is utilised to move the shutter 136 automatically to close the passage through the guides 112 and 113 so that rubbish does not accumulate in the guides. For this purpose the pivot or rod 138 on which the heater 10 is supported is fixed to the operating handle 139 of the heater so as to rotate when the heater is swung up or down. At the end nearer to the Beta-ray device the pivot rod 138 is provided with a crank 140 at the end of which is a pin 141 to which a spring 142 is attached. The other end of the spring is attached to the pivoted shutter, at one side of the pivot. The upward movement of the heater relaxes the spring and the shutter will drop by gravity to the closed position, see Figure 11.

Assuming the machine is running and a test is desired, the operator breaks the rod and as the heater 10 is down and the spring 142 stretched, the shutter is pushed down manually and held closed by a small catch 143 which engages a notched plate 144 attached to the shutter 136. When the test is over the operator trips the catch by a handle 145 and the shutter swings up, under the tension of the spring 142, to expose the passage.

The chamber casing 110 is pivotally mounted at 146 so that it can be swung in the direction of the arrow, Figure 6, to bring its operative face horizontal and facing upwards, and the consequence of such a movement is that the Beta-ray source is emitting rays into the atmosphere and in a direction where they are likely to strike the operator. As a precaution against such an event there is provided an arcuate flap 147 which is pivoted to the ray source at 148 and operated so that in one position the source is exposed while in the other position the window of the source is closed by the flap. A lever 149 is attached to the arcuate flap and connected by a link 150 to the hinge 121 between chamber and holder in such manner that as the chamber casing is opened, the lever is swung and the flap 147 moves up to cover the window 117 of the ray source. When the chamber casing 110 is closed the flap is lowered. The chamber casing is held in the closed position by a clamp 151.

The movable screen holder, the shutter operated by the heater, and the arcuate flap form the subject of the co-pending application, Serial No. 315,022 filed October 16, 1952, and no claim to these devices is made herein.

The ray source is adjustable towards and away from its ionisation chamber and for this purpose, see Figures 6 and 7, the box 111 has fixed thereto a bracket 152 whose rear comprises a thick plate 153 which is threaded to receive two rotatable screws 154. These screws are fixed to bevel gear wheels 155 which are rotated by other bevel gear wheels 156 fixed on a shaft 157 journalled in bearings 158. A hand knob 159 is fixed to the shaft 157 and when the knob is rotated the box 111 is moved to and fro. A pointer 160 fixed to the bracket 152 travels over a scale 161 and subdivisions of the scale measurement are afforded by a dial 162 marked into suitable divisions, against which moves a pointer 163 fixed to the knob.

For reasons given later in the description of the operation of the apparatus it is technically desirable to use a second source and chamber jointly constituting a "balancing device," with a metal screen interposed which has a ray absorption equivalent to that of the desired tobacco mass and to arrange this chamber electrically in opposition to the first chamber so that any current resulting from the measurement is the difference between the currents in each chamber.

In order that the output or current from the apparatus shall be a measure of the tobacco mass only, it is necessary that in all conditions of measurement any extraneous factors affecting the measuring device shall be applied to the balancing device so that the resulting current depends solely on the tobacco mass.

For instance where measurement is made on the wrapped rod, in order to prevent condensation in the measuring device due to the moisture from the freshly sealed seam, it has been found necessary to provide heaters, as shown at 164, Figure 6, which may be thermostatically controlled. In the case where measurement is made while loose tobacco is conveyed on a tape it will be appreciated that the rays pass through the tape. The absorption by the tape changes with use because the tape wears away, particularly at first, and the pores of the tape tend to become filled with dirt, particles of tobacco and possibly particles of the metal (steel), of the guides and other members which control the path and movement of the tape.

To meet these requirements identical heaters and controls therefor are provided in the measuring device and the balancing device, and where measurement is effected on a filler conveyed by a tape and the rays pass through the tape, see Figures 2 and 3, the balancing device consisting of ray chamber 165 and ionisation chamber 166 is positioned to scan the tape at a place IV, Figure 1, where the tape does not carry tobacco.

The movable screen holder above described is used with the measuring device and an identical screen holder is provided for the balancing device. In other words, the measuring and balancing devices are identical in all respects save that the balancing device is so adjusted that in place of the tobacco passing through the measuring device a metal screen, the screen 125, Figure 9, whose ray absorption is equivalent to that of the desired tobacco mass, is used in the balancing device.

As a measure of economy in manufacture the measuring chamber need not have the ray position adjustment so long as the balancing device is adjustable.

Where a flat tape is scanned a scraping device may be employed on the return run of the tape 2 so that after it leaves the balancing device at position IV, Figure 1, the tape is clean and free from dust or other foreign bodies which would interfere with the accuracy of the measurement. It is disposed between the device at IV and the pulley just above it around which the tape turns before passing through the hopper. The scraping device is shown in Figure 13 and consists merely of a box 200 containing scrapers 201 and an outlet 202 leading to an exhaust system. As a further safeguard against inaccuracy due to dust the measuring and balancing device may be provided with blowers 203, Figure 14, which blow a jet of air across the face of each ray box and removes any dust therefrom.

These features of the balancing device and its location relatively to a tape form the subject of the copending U. S. application Serial No. 320,284 filed November 12, 1952, now abandoned, and no claim is made herein to them and they are described only as part of the best way of carrying out the present invention.

The operation of the apparatus will now be described with reference to Figure 12 during which description other parts will be referred to.

The window in the casing 110 is positioned opposite the radio-active source in the box 111 so that the rays that penetrate the filler pass into the chamber. A source of D. C. voltage, e. g. a battery 58 is applied between the inner and outer electrodes 118 and 115. Ignoring for a moment a chamber 166 which constitutes a balancing device whose function is described below, the beta particles that enter the chamber 115 causes ionisation of the gas (air) in the presence of the applied potential and the resultant current, which is a measure of the energy of the rays penetrating the tobacco, develops a voltage, across a high value resistance 60.

If only a single ionisation chamber is used, the battery 58 is connected in series with the high value resistance 60. The voltage across 60 can then be offset by inserting in the feed-back line 66 a battery with a variable potentiometer to produce a counter voltage equivalent to that developed across resistance 60 when the tobacco being measured is of the desired mass. That is, when the mass is correct there is no output from the device while variations from this mass give rise to a voltage, which may be termed an output, across the resistance 60. In practice the offsetting of the "desired mass" voltage across 60 resulting from the ionisation is usually balanced by the chamber 166 which is ionised as described below. The output voltage must be amplified before it can be put to practical use, and because it is essentially a direct current, a form of D. C. amplifier is necessary.

It has been found most satisfactory to use a vibrating condenser electrometer 61 in which the input D. C. potential is first converted to A. C. by applying it through a resistance 62 to a condenser 63 the capacity of which changes at a suitable frequency (500 cycles). An A. C. voltage proportional to the D. C. input is developed across this condenser, which is passed into a conventional A. C. amplifier 64 and subsequently rectified to produce a D. C. voltage proportional to and in phase with the deviation from the desired weight.

This output voltage, in addition to energising a direct reading meter 65 operates a correcting circuit.

The value of the resistance 60 referred to earlier across which the voltage is developed is of the order $10^{10}$ to $10^{11}$ ohms. It is found that resistances with a high value like this are rather unstable, that is, the voltage developed across the resistance changes slightly with time. Because of this it has been found desirable to use an additional radio-active source 165 and an ionisation chamber 166, Figure 1, see also Figure 12, as explained previously, to form a balancing device, which, for the desired mass of filler is arranged to pass a current equal and opposite to that from the chamber in the casing 110, measuring the filler. For rod measurement the balancing device can be disposed at any suitable position since nothing passes through it. The high resistance 60 then only conducts the difference in the two currents and, at balance, small fluctuations in the value of this resistance are unimportant. Moreover, it is this difference which is utilised to control the feed rate and the less its average value the more noticeable its fluctuations.

From the A. C. amplifier 64 current passes to a phase-sensitive rectifier 67 which works in synchronism with a maintaining circuit 68 for the vibrating condenser; by this means the output voltage developed at a point 0 across a cathode follower load resistance 69 which receives current from a cathode follower 70, which point is normally at the same potential as the earth line, will change to a positive value or a negative value dependent on whether the output from the measuring chamber relative to that from the balancing chamber is greater or less; in addition provision is made for a controllable portion of this voltage to be fed back along line 66 to the input to stabilise the amplifier against internal variation and to allow adjustment of overall sensitivity.

The indicating meter 65 is connected in series with a variable resistance 71 (to adjust the sensitivity of the meter) between the cathodes of two tubes 72 and 73, the whole arrangement forming a balanced tube voltmeter. The circuits of these tubes are arranged by adjusting a resistance 76 so that with the point 0 at earth potential the two cathodes are at the same potential and there is no current in the centre-zero meter 65. The circuits of the phase-sensitive rectifier 67 and cathode follower 70 are also arranged so that when the output from the measuring chamber in casing 110 is the same as that from the balancing chamber 166 the point 0 is at earth potential.

As a result, when the meter 65 is in the zero position the mass of the filler is at the desired value and when this value varies, the indication on the meter will follow the change, a change of 5% in weight from the desired value of the filler or rod causing full scale deflection, when the variable resistance 71 of the meter is set for maximum sensitivity. This range of 5% is rather narrower than is required in practice and the apparatus can be adjusted up to a full scale deflection equal to, say, 10% change in weight.

As previously mentioned tobacco is not a homogeneous material, and it has been found necessary to introduce an integrating circuit between the meter and the measuring circuit so that the indication will be in accordance with the average mass measured over a short period. This is accomplished by an integrating circuit formed by a resistance 74 and condenser 75. When the potential at the point 0 changes, the control grid of the tube 72 cannot follow immediately because of the large capacity of condenser 75 which must alter its charge, and the speed at which this takes place depends on the value of the resistance 74 which is adjustable.

The output from the amplifier terminals, shown as large black dots, passes to a limit selector unit, shown in the lower part of Figure 12 and designed to vary the feed rate of tobacco from the hopper to the conveyor on which the filler is formed, when the average weight of the cigarettes being produced deviates too much from the desired weight.

It will be appreciated that in a machine of the kind referred to a time-lag exists between the moment of alteration to the feed rate of the hopper and the resultant reaction on the measuring device. Because of this there is a limit beyond which the performance of the machine cannot be improved and the present invention therefore allows the machine to continue running normally until the mean weight of the cigarettes exceeds preset limits (e. g. 1% to 2%). When this happens the feed rate of the hopper is changed at a rate which is preferably constant until the reaction of the increased feed on the measuring device causes the output signal from the amplifier to return to a value such as to give a feed rate within the preset limits.

It will be realised, because of the time lag referred to above, that if the feed rate of the hopper starts changing when the mean weight just exceeds the limit and that the rate of change is fairly fast then by the time the reaction is felt by the measuring device the rate of hopper feed will be such that the mean weight of cigarettes will be well within the preset limits.

In practice the measuring time-constant and the alteration in the rate of hopper feeding is suitably chosen so that when the average weight deviates beyond the set limits correction starts after the lapse of the time-lag and continues until the signal from the detector declines so much that the amplified signal is too weak to hold the relay energized and the relay contact opens. Thus the correction is more than is strictly necessary to return the filler to just within the limits allowed but this over-correction due to the time-lag causes the mean weight to be returned to approximately the desired mean weight. Speed in correction is highly desirable so as to keep the performance of the machine as regular as possible.

This simple method of control has been found to allow very fast correction when the limits are exceeded without causing the hunting associated with continuous feed-back control of machines of this nature having reaction time-lags of the same order.

Referring now to the lower part of Figure 12, it will be seen that the limit selection unit comprises a transformer 77, rectifiers 78, 79 and 80, a twin triode tube amplifier with tubes 81 and 82, an adjustable time-constant circuit comprising resistance 83 and condenser 84, two polarised relays 85 and 86, a control circuit relay 87 with four contacts 87A, B, C, and D, balancing potentiometers 88 and 89 ganged for simultaneous operation, potentiometers 90 and 91 for "heavy" and "light" limit adjusting respectively and two indicator lights 92 and 93 and sundry minor details.

The input voltage is applied between point A and the earth line, to the integrating circuit 83—84 which is adjusted to have the same time-constant as components 74—75 in the upper part of the figure. The output voltage across condenser 84 is applied to the grid of tube 81. Consider now that contacts 87A associated with relay 87 are open, that the sliding contacts 90A and 91A of potentiometers 90 and 91 are touching the middle point C and that the potential of point C has been adjusted to agree with that at point B when the input at point A is at earth potential. The contacts 85A and 86A of the polarised relays 85 and 86 are adjusted mechanically so that they do not make contact under these conditions, but the contacts of relay 85 will close should point B become slightly more positive than point C and similarly the contacts of relay 86 will close when point B becomes less positive than point C.

Under these conditions of balance, when the voltage at point A changes from that of earth potential and causes the grid of tube 81 to change, that is when the average weight deviates too much from the set value, an amplified inverse change (that is, when grid goes positive, anode goes negative) will occur at point B and current will flow through both the windings of the polarised relays. If point B has become more positive, relay 85 will close its contacts 85A as already described.

Assume now that the sliding contacts of potentiometers 90 and 91 are moved away from point C and that point A is again at earth potential, then the potential of point B will be as before but current will now be flowing through relays 85 and 86 in the direction opposite to that necessary to cause contact closure. Under these new conditions the potential of point B will have to change more than before to cause the current through the relays to reverse and cause their contacts to close. By this means the amount of weight deviation necessary before the relays operate to alter the rate of change of hopper feed can be accurately and remotely controlled by shifting the potentiometer control to a convenient place on the machine.

The solenoids 34 and 35 of the actuator, Figure 5, are connected across rectifiers 79 and 80 respectively and the solenoids are energised alternatively to cause alteration to the hopper feed rate all the time that contacts of relay 85 or 86 are closed.

In parallel with the solenoids, are indicator lamps 92 and 93 which light-up in the normal operation of the machine to show that alteration in the feed rate is taking place.

A further rectifier 78 supplied from transformer 77 allows remote operation of the control relay 87 and hence remote control of the limit selection unit. A switch 95 is fixed to the machine starting lever and opens the circuit when the machine is stopped. This takes the limit selection unit out of operation until after the machine has restarted. Restarting of the machine will shift switch 95 back to the closed position but this will not re-energise relay 87 because contact 87D breaks as the switch 95 breaks when machine is stopped. Later the operator presses a button 94 as soon as the machine is running properly, and this gives a feed through the line 94A to energise the relay 87, to bring the limit selection unit back into operation. The button 94 is the inner part of an on/off press-button type switch of the concentric construction with the outer part 94B also movable. When the machine is running, depressing the outer part 94B of the switch breaks the circuit to the relay 87 and puts the limit selection unit out of action, but it can be brought in again by pressing button 94. The contact 87A of the control relay 87 keeps the grid of tube 81 at earth potential until the machine has settled down and the button 94 is pressed. A jack plug socket 96 allows the potential between points B and C to be checked while the machine is at rest.

Once the complete equipment is working it is necessary to set the screen 125 of the balancing device so that the amplifier output is zero.

The measuring device in the machine being described is arranged for cigarettes with a circumference of 26 m./m. and as the absorption depends on the number of cigarettes per ounce being manufactured, it will be necessary to adjust the balancing device to suit. In this example the screen has to be of a thickness corresponding to a weight of 180 m./gm. per square centimeter.

The strips which are used as absorbers are available in varying thicknesses and provide a coarse adjustment, and a fine adjustment, the knob 159, moves the source relative to the screen.

It should be noted that as tobacco is not a homogeneous material it is not possible to make the final adjustment of the balancing device until after a long run on the machine. For the same reason a time-constant or integrating circuit as previously described is provided in the equipment so that the final output from the amplifier is an average over a short period.

Once the balancing device has been satisfactorily adjusted it should not require further alteration as the very slight decay in the activity of the sources is the same in the measuring device and in the balancing device.

It has been previously remarked that the present method does not suffer from difficulties due to moisture content but it may nevertheless be desirable to incorporate modifications to take moisture into consideration, as the users will, as a rule, desire that the final product shall weigh a certain amount at a given percentage moisture content which may not be that at which the tobacco has been manipulated. The invention may therefore include a device for measuring the moisture content of the tobacco being worked and recording it and regulating the above described apparatus accordingly. Any suitable known device may be used to determine moisture content, for example, by measuring the resistance of a predetermined mass of tobacco positioned between electrodes from which suitable regulation may be injected into the circuit of the apparatus at a suitable position. Suitable devices for this purpose are described in the copending application, Serial No. 304,412.

What we claim as our invention and desire to secure by Letters Patent is:

In apparatus for automatic control of the feeding rate of tobacco in response to variation in mass of a length of moving tobacco filler, including feed mechanism for delivering tobacco from a source to form the filler, variable control means for altering the rate of feed by said mechanism, and a detector responsive to variation in mass of the filler and operable to regulate said variable control means, the combination with a detector comprising a Beta-ray measuring device positioned adjacent the moving filler to detect variation in mass thereof, of an amplifying circuit on which the signal output of said measuring device is impressed, said amplifying circuit including an integrating device for averaging over a predetermined period the detector signal output, relay means energized from said circuit and having two contacts selectively operable in response to detection of variation of the filler from the desired mass by a predetermined tolerance above and below the desired value, and means controlled on operation of either of said contacts to raise and lower respectively the rate of feed of tobacco, the time-lag between rate of feed alteration and subsequent response from the detector being such that when the mass of the filler varies from the desired value beyond the predetermined tolerance, alteration of the rate of tobacco feed starts and continues until the mass of tobacco passing the detector differs from the desired mass by a value less than the predetermined tolerance, whereupon the selected contact is rendered inoperable.

References Cited in the file of this patent

UNITED STATES PATENTS

| | | |
|---|---|---|
| 2,083,173 | Ruau | June 8, 1937 |
| 2,264,725 | Shoupp et al. | Dec. 2, 1941 |
| 2,340,914 | Whitaker | Feb. 8, 1944 |
| 2,357,860 | Whitaker | Sept. 12, 1944 |
| 2,519,089 | Whitaker | Aug. 15, 1950 |

FOREIGN PATENTS

| | | |
|---|---|---|
| 587,210 | Great Britain | Apr. 17, 1947 |
| 684,503 | Great Britain | Dec. 17, 1952 |

Notice of Adverse Decision in Interference

In Interference No. 88,182 involving Patent No. 2,737,186, D. W. Molins and G. F. W. Powell, Machines for manipulating cut tobacco, final judgment adverse to the patentees was rendered Feb. 14, 1957, as to claim 1.

[*Official Gazette April 9, 1957.*]